US008970475B2

(12) United States Patent
Haggerty et al.

(10) Patent No.: US 8,970,475 B2
(45) Date of Patent: Mar. 3, 2015

(54) MOTION SENSITIVE INPUT CONTROL (75) Inventors: Myra Mary Haggerty, San Mateo, CA (US); Robert Mansfield, Fremont, CA (US)

(73) Assignee: Apple Inc., Cupertino, CA (US)

(*) Notice: Subject to any disclaimer, the term of this patent is extended or adjusted under 35 U.S.C. 154(b) by 410 days.

(21) Appl. No.: 12/488,474

(22) Filed: Jun. 19, 2009

(65) Prior Publication Data

US 2010/0321286 A1 Dec. 23, 2010

(51) Int. Cl.
G09G 5/00 (2006.01)
G06F 3/041 (2006.01)

(52) U.S. Cl.
CPC .................................. *G06F 3/0418* (2013.01)
USPC ........................................................ 345/156

(58) Field of Classification Search
None
See application file for complete search history.

(56) References Cited

U.S. PATENT DOCUMENTS

| 5,483,261 | A | 1/1996 | Yasutake |
| 5,488,204 | A | 1/1996 | Mead et al. |
| 5,760,690 | A | 6/1998 | French |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,520,013 | B1* | 2/2003 | Wehrenberg .................. 73/489 |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,218,226 | B2 | 5/2007 | Wehrenberg |
| 7,663,607 | B2 | 2/2010 | Hotelling et al. |
| 8,479,122 | B2 | 7/2013 | Hotelling et al. |
| 2002/0118177 | A1* | 8/2002 | Newton ........................ 345/173 |
| 2005/0154798 | A1* | 7/2005 | Nurmi ............................... 710/1 |
| 2005/0181808 | A1* | 8/2005 | Vaudreuil .................. 455/456.3 |
| 2005/0212759 | A1* | 9/2005 | Marvit et al. ................. 345/156 |
| 2006/0026521 | A1 | 2/2006 | Hotelling et al. |

(Continued)

FOREIGN PATENT DOCUMENTS

JP 2000-163031 A 6/2000
JP 2002-342033 A 11/2002

(Continued)

OTHER PUBLICATIONS

Indoor Localization Using Camera Phones, Proceedings of the Seventh IEEE Workshop on Mobile Computing System & Applications, 2006, ISBN: 0-7695-2763-9/06, p. 1-7.*

(Continued)

*Primary Examiner* — Grant Sitta
*Assistant Examiner* — Kirk Hermann
(74) *Attorney, Agent, or Firm* — Morrison & Foerster, LLP (57) ABSTRACT A motion sensitive input control configured to prevent unintended input caused by inadvertent movement of a computing device. In one embodiment, unintended input can be prevented by disregarding an input event if a change in motion of the computing device is detected simultaneously with or immediately prior to the detected input event. In another embodiment, unintended input can be prevented by reducing the sensitivity of an input device during a motion-based state associated with the computing device. In this manner, the likelihood of inadvertent motion of a computing device causing an unintended input event can be reduced.

19 Claims, 8 Drawing Sheets

(56) References Cited

U.S. PATENT DOCUMENTS

| | | | |
|---|---|---|---|
| 2006/0097991 | A1 | 5/2006 | Hotelling et al. |
| 2006/0139807 | A1* | 6/2006 | Shimotono et al. ........... 360/137 |
| 2006/0197753 | A1 | 9/2006 | Hotelling |
| 2007/0075965 | A1* | 4/2007 | Huppi et al. .................. 345/156 |
| 2008/0136587 | A1* | 6/2008 | Orr .............................. 340/5.31 |
| 2008/0146301 | A1 | 6/2008 | Goggin et al. |
| 2008/0225000 | A1 | 9/2008 | Bellwood et al. |
| 2008/0263344 | A1* | 10/2008 | Grignani et al. .................. 713/2 |
| 2008/0316061 | A1 | 12/2008 | Goggin et al. |
| 2009/0262074 | A1* | 10/2009 | Nasiri et al. .................. 345/158 |
| 2009/0265671 | A1* | 10/2009 | Sachs et al. .................... 715/863 |
| 2009/0298533 | A1* | 12/2009 | Alameh et al. ............. 455/556.1 |
| 2010/0148999 | A1* | 6/2010 | Casparian et al. ............... 341/34 |
| 2010/0161522 | A1* | 6/2010 | Tirpak et al. ..................... 706/11 |
| 2010/0194692 | A1* | 8/2010 | Orr et al. ....................... 345/173 |

FOREIGN PATENT DOCUMENTS

| | | | |
|---|---|---|---|
| WO | WO 03019806 | A1 * | 3/2003 |
| WO | WO 2005109879 | A2 * | 11/2005 |

OTHER PUBLICATIONS

Hinckley, K. et al. (2000). "Sensing Techniques for Mobile Interaction," ACM UIST 2000, Symposium on User Interface Software and Technology, *CHI Letters* 2(2):91-100.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

MOTION SENSITIVE INPUT CONTROL

FIELD OF THE DISCLOSURE

This relates generally to input devices, and more particularly, to preventing unintended input caused by inadvertent movement of a computing device.

BACKGROUND OF THE DISCLOSURE

Many types of input devices are presently available for performing operations in a computing system, such as buttons or keys, mice, trackballs, joysticks, touch sensor panels, touch screens and the like. Touch sensitive input devices generally recognize input events when a user touches a touch sensitive surface. Touch sensitive input devices using capacitive touch technology can detect an input event with virtually no force, while other touch sensing technologies (e.g., resistive touch technology) require a somewhat greater amount of force. In contrast, mechanical input devices, such as push buttons for example, generally do not recognize input events unless a user taps or presses the mechanical input device with an amount of force great enough to actuate a switch through mechanical motion. This amount of force is generally greater than the amount of force that would trigger recognition of an input event on a capacitive or resistive touch sensitive surface.

These varieties of input devices exist for performing operations in computing devices, such as desktops, laptops, media players, remote controls, personal digital assistants (PDAs), cellular phones, etc. A user can cause an operation to be performed in computing device by applying an input event to an input device. In one example, a user can move a cursor displayed on a display screen of the computing device by touching an input device in a particular manner. In another example, a user can select an item displayed on the display screen by tapping an input device in a particular location.

With input devices that provide touch sensitive surfaces, various sensor elements can be provided relative to a surface of a computing device, and an input event can be detected by sensing a change in some measure, such as capacitance for example, that is associated with the sensor elements and that exceeds a particular threshold level. If the threshold level is set too low, the touch sensitive surface can become too sensitive, allowing unintended actions (e.g., setting the touch sensitive surface on a table) or effects (e.g., noise) to be detected as an input. If the threshold level is set too high, the touch sensitive surface can become too insensitive, allowing intended input actions (e.g., a light touching of the surface) to go undetected.

Accordingly, determining a proper threshold level for a touch sensitive device can provide unique challenges.

SUMMARY OF THE DISCLOSURE

A motion sensitive input control is disclosed that can prevent unintended input caused by inadvertent movement of a computing device. For example, if a user operates a computing device on public transportation and the user's finger hovers over an input area of the computing device during a bump in the ride, the bump can cause the finger to inadvertently tap the input area. If the computing device is configured to implement a click action when a tap input event is detected on the input area, the inadvertent tap can result in an unintentional click in the user interface of the computing device. This can lead to undesirable user interface behavior, such as the deletion or premature sending of an e-mail depending on where the cursor is located at the time of the inadvertent tap input event.

In one embodiment, motion sensitive input control can prevent unintended input by disregarding an input event if a change in motion of the computing device is detected simultaneously with or immediately prior to the detected input event. In another embodiment, motion sensitive input control can prevent unintended input by reducing the sensitivity of an input device during a motion-based state associated with the computing device. In this manner, the likelihood of inadvertent motion of a computing device causing an unintended input event can be reduced.

A motion-based state, for example, can be determined based on a particular type of network connection (e.g., if the computing device connects to a particular type of network during a period of movement, such as traveling on public transportation), when the computing device is operating (e.g., if the computing device is associated with movement during particular time periods) and where the computing device is operating (e.g., if global positioning system capability and/or a camera indicate that the computing device is moving or not at a home or business location).

The sensitivity of the input device can be reduced in a variety of ways. For example, in one embodiment, an input event threshold associated with the magnitude of a detected measure of input (e.g., capacitance for a capacitive input device) can be adjusted during a motion-based state. In another embodiment, a threshold associated with how long an input must be recognized in order for the input to be recognized as an input event can be adjusted during a motion-based state.

DETAILED DESCRIPTION OF THE PREFERRED EMBODIMENTS

In the following description of preferred embodiments, reference is made to the accompanying drawings where it is shown by way of illustration specific embodiments in which the disclosure can be practiced. It is to be understood that other embodiments can be used and structural changes can be made without departing from the scope of the embodiments of this disclosure.

Embodiments of the disclosure relate to preventing unintended input caused by inadvertent movement of a computing device. In one embodiment, unintended input can be prevented by disregarding an input event if a change in motion of the computing device is detected simultaneously with or immediately prior to the detected input event. In another embodiment, unintended input can be prevented by reducing the sensitivity of an input device during a motion-based state associated with the computing device. In this manner, the likelihood of inadvertent motion of a computing device causing an unintended input event can be reduced.

Although some embodiments of this disclosure may be described and illustrated herein in terms of a portable computing device such as a laptop, it should be understood that embodiments of this disclosure are not so limited, but are generally applicable to any device, system or platform, configured for receiving input and that can be operated in an environment susceptible to movement. Further, although some embodiments of this disclosure may describe and illustrate a tap on a capacitive trackpad as a representative type of unintended input and input device, respectively, it should be understood that embodiments of this disclosure are not so limited, but are generally applicable to any type of input event and input device.

Figure 1:
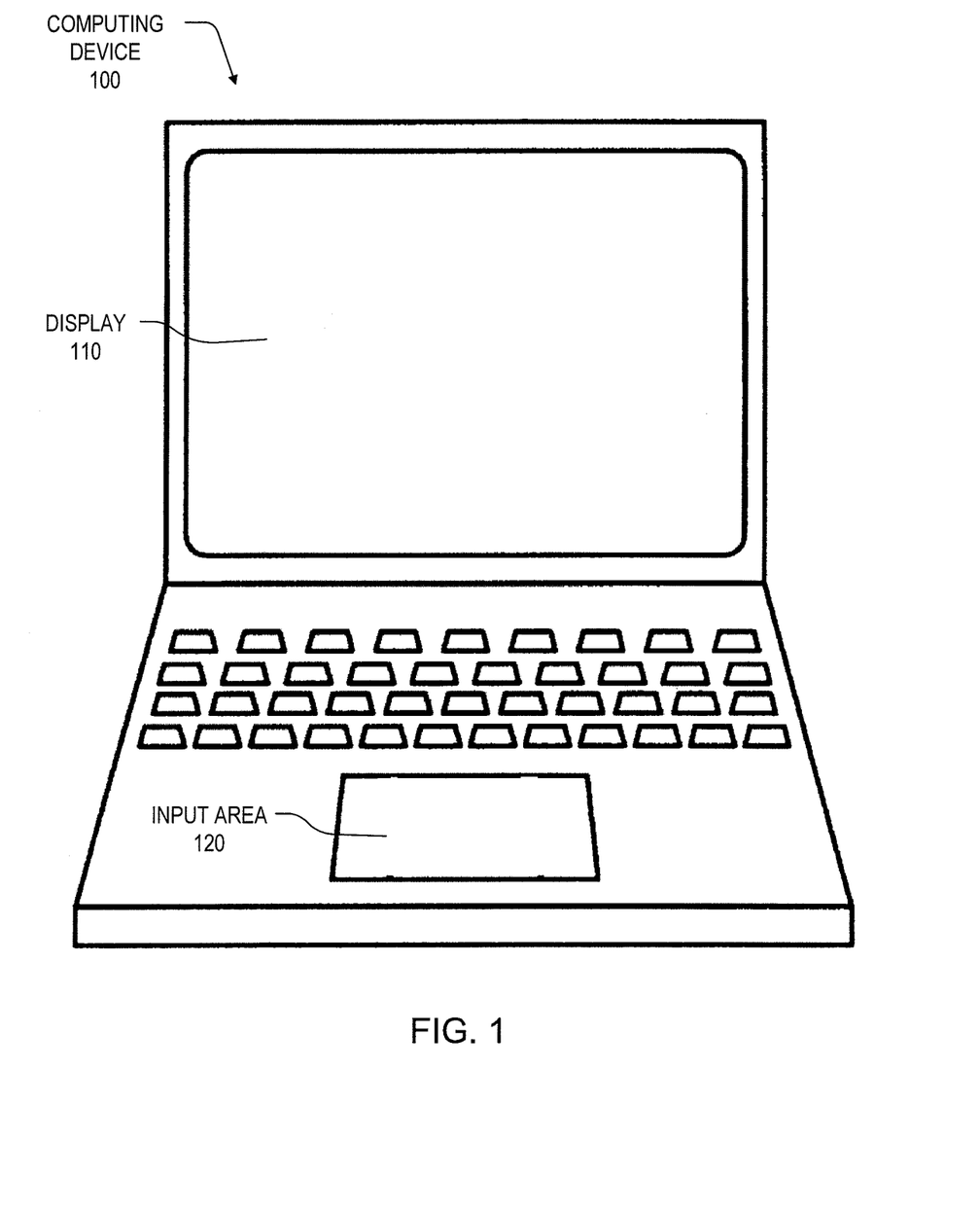
FIG. 1 illustrates an exemplary computing device with motion sensitive input control according to an embodiment of the disclosure.

FIG. 1 illustrates computing device 100 configured with motion sensitive input control. As illustrated in the embodiment of FIG. 1, computing device 100 can include display 110 and input area 120. Input area 120 can include a touch sensitive surface of an input device, such as a trackpad, associated with computing device 100. Computing device 100 can also include one or more motion sensors (not shown) inside its housing.

Computing device 100 can be configured to prevent unintended input in input area 120 caused by inadvertent movement of computing device 100. For example, if a user operates computing device 100 on public transportation and the user's finger hovers over input area 120 during a bump in the ride, the bump can cause the finger to inadvertently tap input area 120. If computing device 100 is configured, for example, to implement a click action when a tap input event is detected on input area 120, the inadvertent tap can result in an unintentional click in the user interface of computing device 100. This can lead to undesirable user interface behavior, such as, for example, the deletion or premature sending of an e-mail depending on where the cursor is located at the time of the inadvertent tap input event.

Figure 2:
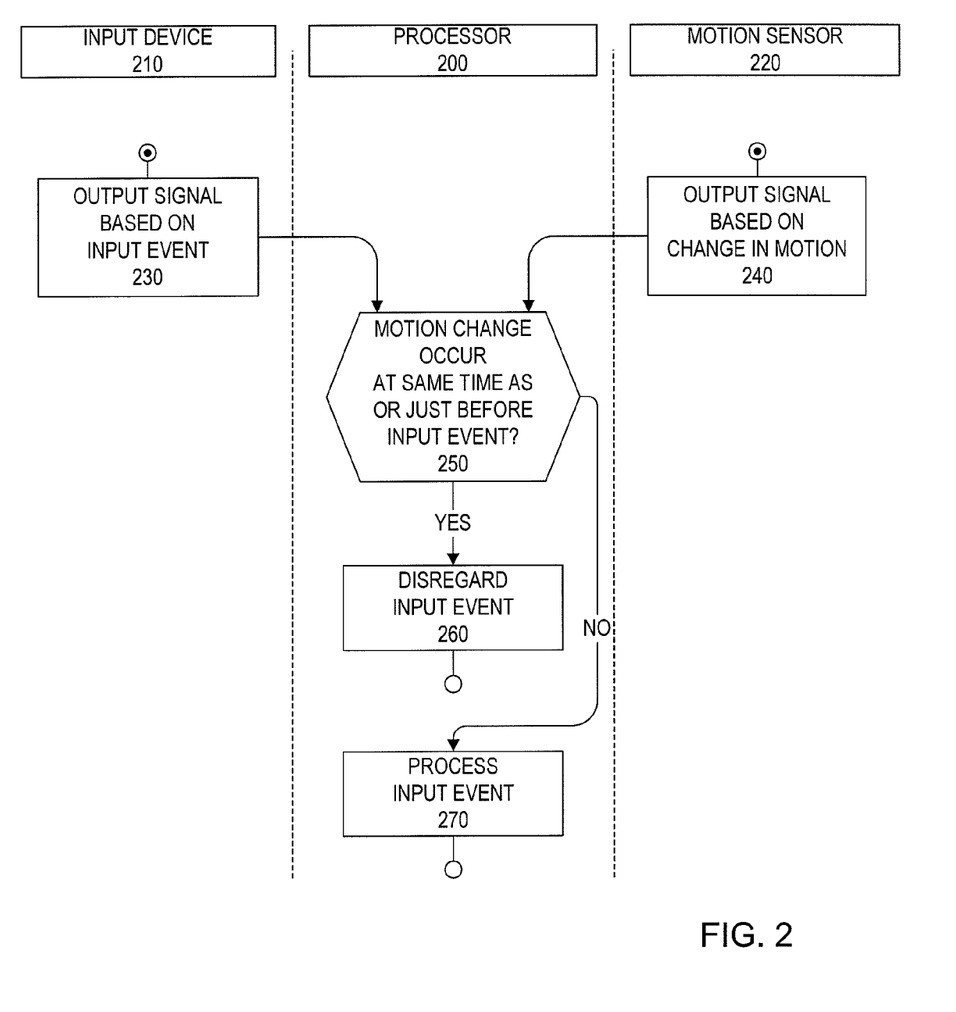
FIG. 2 illustrates an exemplary process in which a computing device can determine whether to disregard or process an input event according to an embodiment of the disclosure.

In one embodiment, unintended input can be prevented by disregarding an input event if a change in motion of the computing device is detected simultaneously with or immediately prior to the detected input event (e.g., a predetermined number of milliseconds). For example, as illustrated in FIG. 2, computing device 100 can include input device 210, processor 200 and motion sensor 220. Input device 210 can be configured to output (block 230) a signal to processor 200 when an input event is detected. Similarly, motion sensor 220 can be configured to output (block 240) a signal to processor 200 when a change in motion is detected. When processor 200 receives output from both input device 210 and motion sensor 220, processor 200 can determine (block 250) whether the change in motion occurred simultaneously with or immediately prior to the input event. If processor 200 determines that the change in motion occurred simultaneously with or immediately prior to the input event, processor 200 can disregard (block 260) the input event. In contrast, if processor 200 determines that the change in motion did not occur simultaneously with or immediately prior to the input event, processor 200 can process (block 270) the input event.

Any suitable input event can be detected by input device 210 for consideration by processor 200 in block 250, such as a touch event or gesture for example. A "touch event" can refer to an event other than a mere touching of input device 210. Rather, a touch event can be one of several types of touch events, including, for example, a "touch begin" event (e.g., initial touch is detected), a "touch move" event (e.g., after initial touch is detected, the coordinates of the touch change), and a "touch end" event (e.g., after initial touch is detected, the touch is no longer detected). A gesture can be based on a series of touch events—e.g., touch down+multiple touch moved+touch up events–and/or some other type of input event or events (e.g., press, hold, etc.) that can be captured by input device 210 and used by processor 200 to implement a function of computing device 100.

Any suitable type of motion change can be detected by motion sensor 220 for consideration by processor 200 in block 250. For example, in one embodiment, any detected change in motion above a specified threshold can be considered by processor 200 as potentially causing an unintended input event. In another embodiment, only a spike in the output from motion sensor 220 can be considered by processor 200 as potentially causing an unintended input event, since a spike in the output can indicate a particular type of motion akin to an inadvertent jostling of computing device 100.

Further, any suitable type of motion sensor can be utilized in accordance with the teachings of the present disclosure. For example, a dedicated one-dimensional motion sensor can be utilized in an embodiment in which inadvertent motion of computing device 100 in only one direction is likely to cause an unintended input to be prevented (e.g., preventing a laptop trackpad from bouncing up into a finger due to inadvertent motion, causing a false tap input event). A dedicated two-dimensional motion sensor can be utilized in an embodiment in which inadvertent motion of computing device 100 in either or both of two directions is likely to cause an unintended input to be prevented (e.g., preventing a laptop trackpad from lateral movement due to inadvertent motion when a finger is already touching the trackpad, causing a false gesture or tracking input event). And a dedicated three-dimensional motion sensor can be utilized in an embodiment in which inadvertent motion of computing device 100 in any direction is likely to cause an unintended input to be prevented (e.g., preventing an input device such as a trackball from inadvertent contact in any direction with a finger, causing a false trackball movement input event). In another embodiment, computing device 100 can utilize a three-dimensional motion sensor in accordance with the teachings of the present disclosure and for other purposes, such as detecting when computing device 100 is falling in order to park its hard drive and take any other preventive action.

Figure 3:
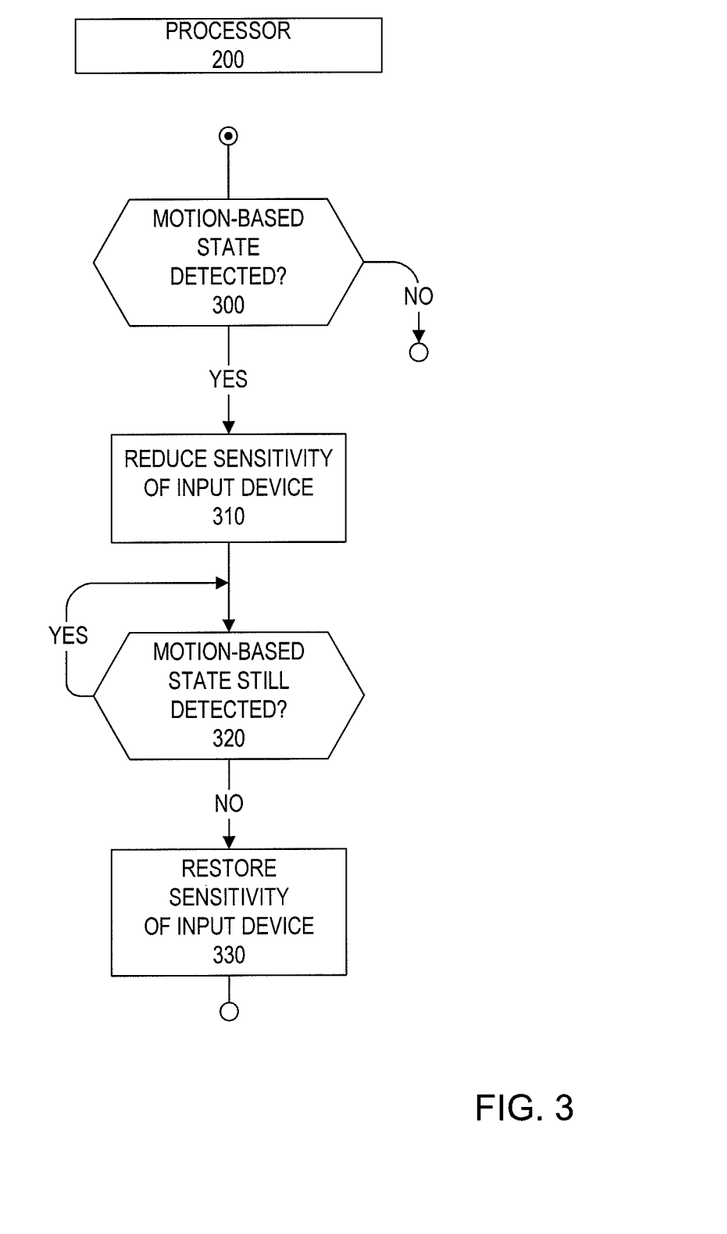
FIG. 3 illustrates an exemplary process in which a computing device can determine whether to reduce the sensitivity of an input device according to an embodiment of the disclosure.

In another embodiment, unintended input can be prevented by reducing the sensitivity of an input device during a motion-based state associated with the computing device. In this manner, the likelihood of inadvertent motion of a computing device causing an unintended input event can be reduced. For example, as illustrated in FIG. 3, processor 200 can detect whether a state of computing device 100 associated with motion (block 300) exists. If a state of computing device 100 associated with motion is detected, processor 200 can reduce (block 310) a sensitivity of input device 210 during the detected state. When the detected state is no longer detected (block 320), processor 200 can restore (block 330) the sensitivity of input device 210 to its previous level.

States of computing device 100 that can be associated with motion can be widely varied. In one embodiment, a motion-based state can be determined based on a network connection state associated computing device 100. For example, if a user connects to a particular type of network during a commute on public transportation, processor 200 can utilize the network connection state to determine that a reduced sensitivity is required for input device 210 while that particular network connection is maintained. In another embodiment, a motion-based state can be determined based on when computing device 100 is operating. For example, if a user of computing device 100 tends to commute on public transportation at similar time periods during the week, processor 200 can utilize current time information to determine that a reduced sensitivity is required for input device 210 during those time periods. Similarly, a motion-based state can be determined based on where computing device 100 is operating. For example, if computing device 100 has global positioning system ("GPS") capability and/or a camera, processor 200 can utilize GPS information and/or camera output to determine whether computing device 100 is stationary or at home or a business location. If processor 200 determines that computing device 100 is moving or not at home or a business location, processor 200 can utilize the location information to determine that a reduced sensitivity is required for input device 210 while computing device 100 is moving or away from home or a business location. Other information can also be used to determine whether computing device 100 is associated with a motion-based state, such as information resulting from an analysis of output from motion sensor 660 over time for example.

Figure 4:
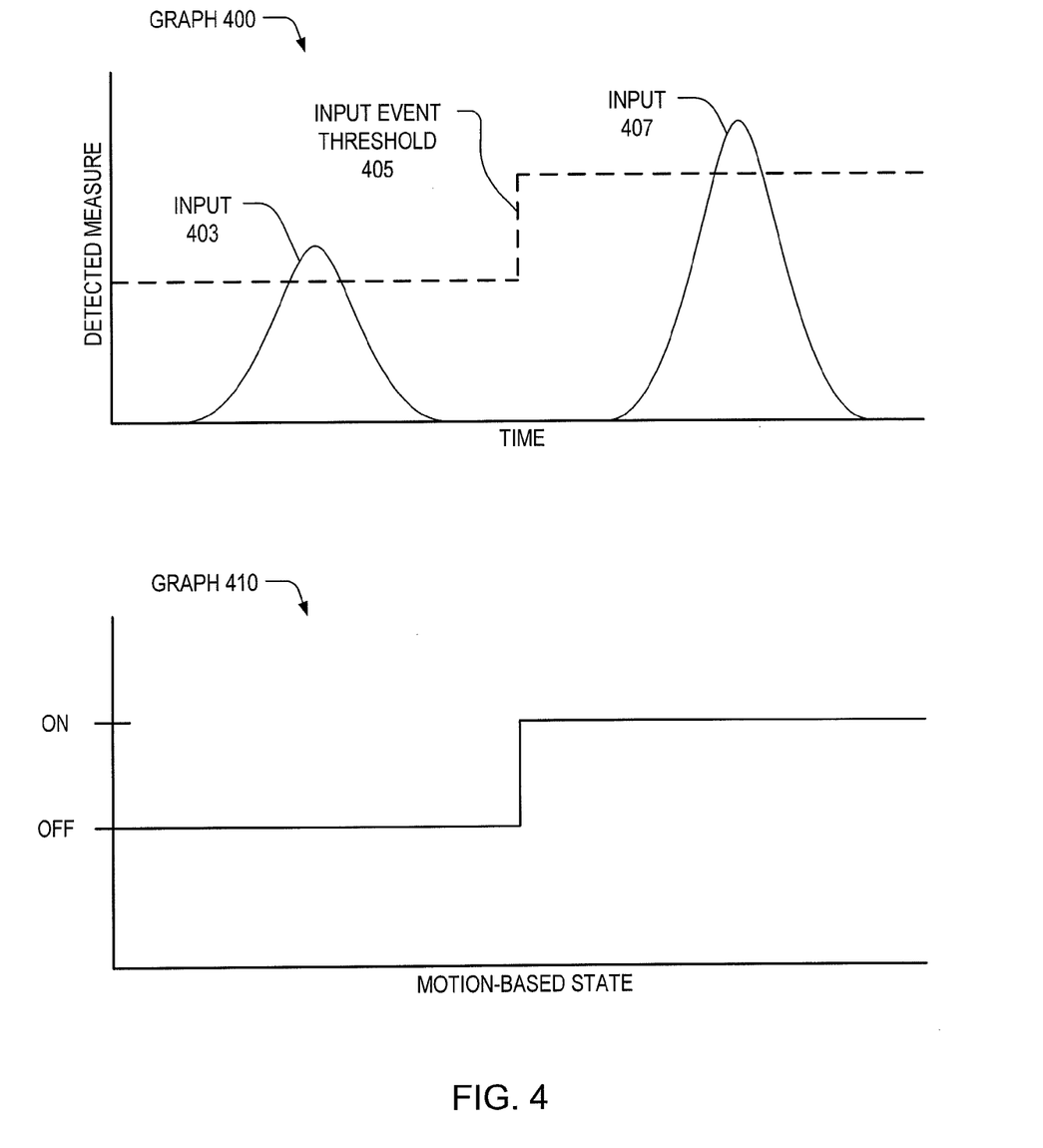
FIG. 4 illustrates exemplary graphs through which a reduction in sensitivity of an input device is depicted by increasing an input event threshold during a motion-based state according to an embodiment of the disclosure.

The manner in which the sensitivity of input device 210 can be reduced can be widely varied. For example, in one embodiment, as illustrated in FIG. 4, an input event threshold associated with the magnitude of a detected measure of an input can be adjusted during a motion-based state. In FIG. 4, graph 400 depicts a plot of a detected measure (e.g., capacitance for a capacitive input device) of input 403 and input 407, and graph 410 depicts whether a motion-based state of computing device 100 corresponds to the detection of input 403 and input 407. As illustrated in FIG. 4, an input event can be recognized based on input 403 since the detected measure associated with input 403 exceeds input event threshold 405 during a non motion-based state of computing device 100. However, during a motion-based state input event threshold 405 can be increased, such that an additional amount of the detected measure is required in order to compensate for unintended inputs to input area 120. Accordingly, during a motion-based state, an input event can be recognized based on input 407, which exceeds input event threshold 405, but an input event cannot be recognized based on an input similar to input 403, which does not exceed input event threshold 405 in view of the increased input event threshold.

Figure 5:
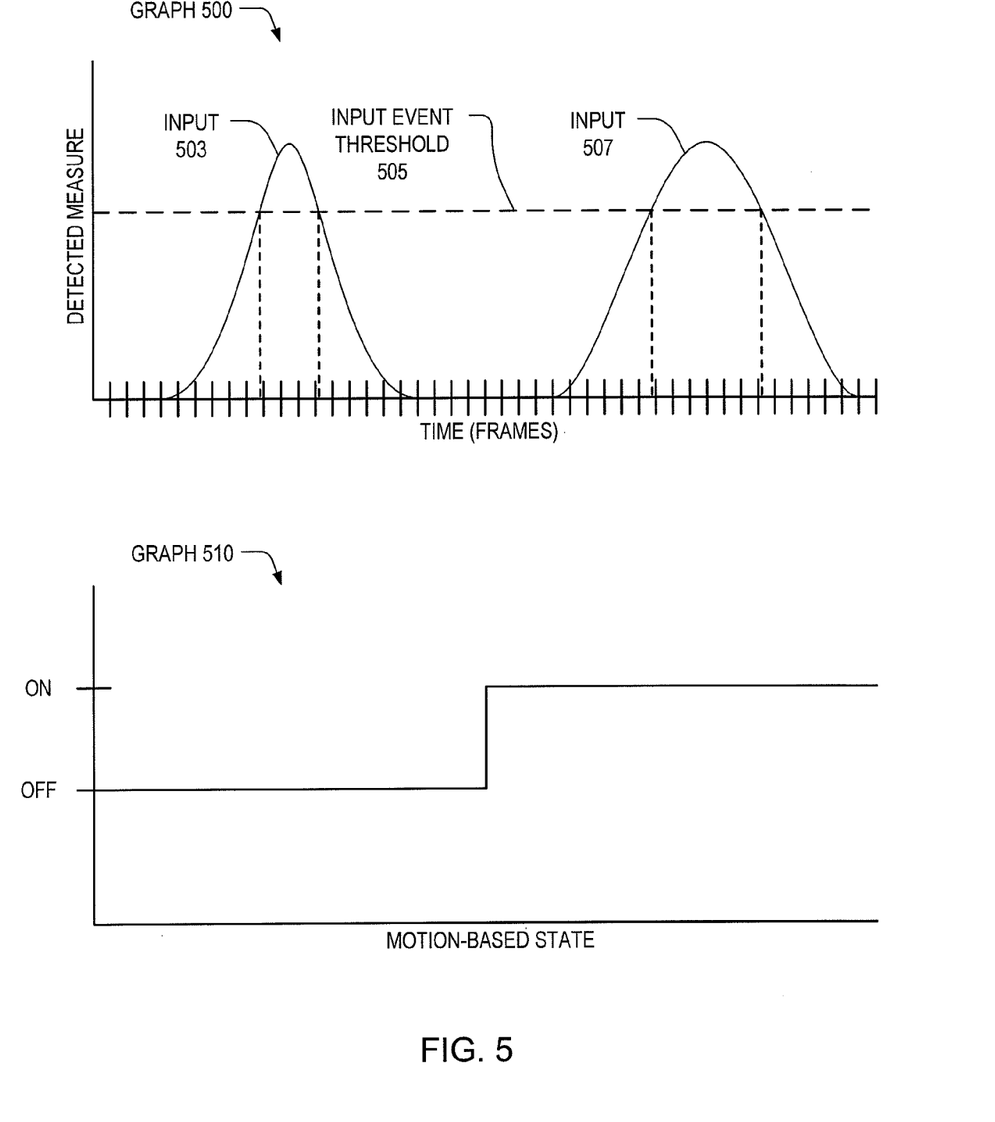
FIG. 5 illustrates exemplary graphs through which a reduction in sensitivity of an input device is depicted by increasing the time required to recognize an input event during a motion-based state according to an embodiment of the disclosure.

In another embodiment, as illustrated in FIG. 5, a threshold associated with how long an input must be recognized in order for the input to be recognized as an input event can be adjusted during a motion-based state. In FIG. 5, graph 500 depicts a plot of a detected measure (e.g., capacitance for a capacitive input device) of input 503 and input 507, and graph 510 depicts whether a motion-based state of computing device 100 corresponds to the detection of input 503 and input 507. In the illustrated embodiment, during a non motion-based state, an input can be required to exceed input event threshold 505 for a threshold of 3 frames in order to be recognized as an input event, whereas, during a motion-based state, an input can be required to exceed input event threshold 505 for a threshold of 6 frames in order to be recognized as an input event. As illustrated in FIG. 5, an input event can be recognized based on input 503 since the detected measure associated with input 503 exceeds input event threshold 505 for at least 3 frames during a non motion-based state of computing device 100. However, during a motion-based state the time-based threshold can be increased, such that the detected measure is required to exceed input event threshold 505 for an additional amount of time (e.g., for 3 additional frames) in order to compensate for unintended inputs to input area 120. Accordingly, during a motion-based state, an input event can be recognized based on input 507, which exceeds input event threshold 505 for at least 6 frames, but an input event cannot be recognized based on an input similar to input 503, which does not exceed input event threshold 505 for at least 6 frames in view of the increased time-based threshold.

Figure 6:
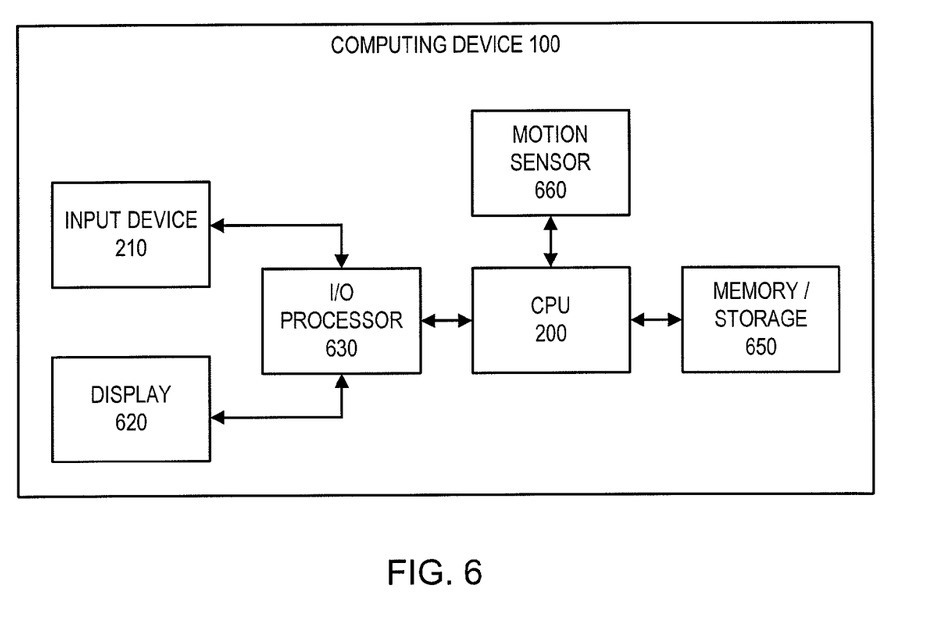
FIG. 6 illustrates an exemplary computing device architecture according to an embodiment of the disclosure.

FIG. 6 illustrates an exemplary architecture of computing device 100. In particular, computing device 100 can include input device 210, display 620, I/O processor 630, processor (CPU) 200 and memory/storage 650. Programming for processing input as described above may be stored in memory/storage 650 of computing device 100, which may include solid state memory (RAM, ROM, etc.), hard drive memory, and/or other suitable memory or storage. CPU 200 may retrieve and execute the programming to process output signals received from input device 210 and motion sensor 660 as described above. Through the programming, CPU 200 can also perform actions based on output signals from input device 210 that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, receiving a text message, sending a text message, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. CPU 200 can also perform additional functions that may not be related to input device processing, and can be coupled to memory/storage 650 and display 620, which may include a liquid crystal display (LCD) for example, for providing a user interface (UI) to a user of the device.

Note that one or more of the functions described above can be performed by firmware stored in a memory (not shown) associated with I/O processor 630 and executed by I/O processor 630, and/or stored in memory/storage 650 and executed by CPU 200. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store a program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 7:
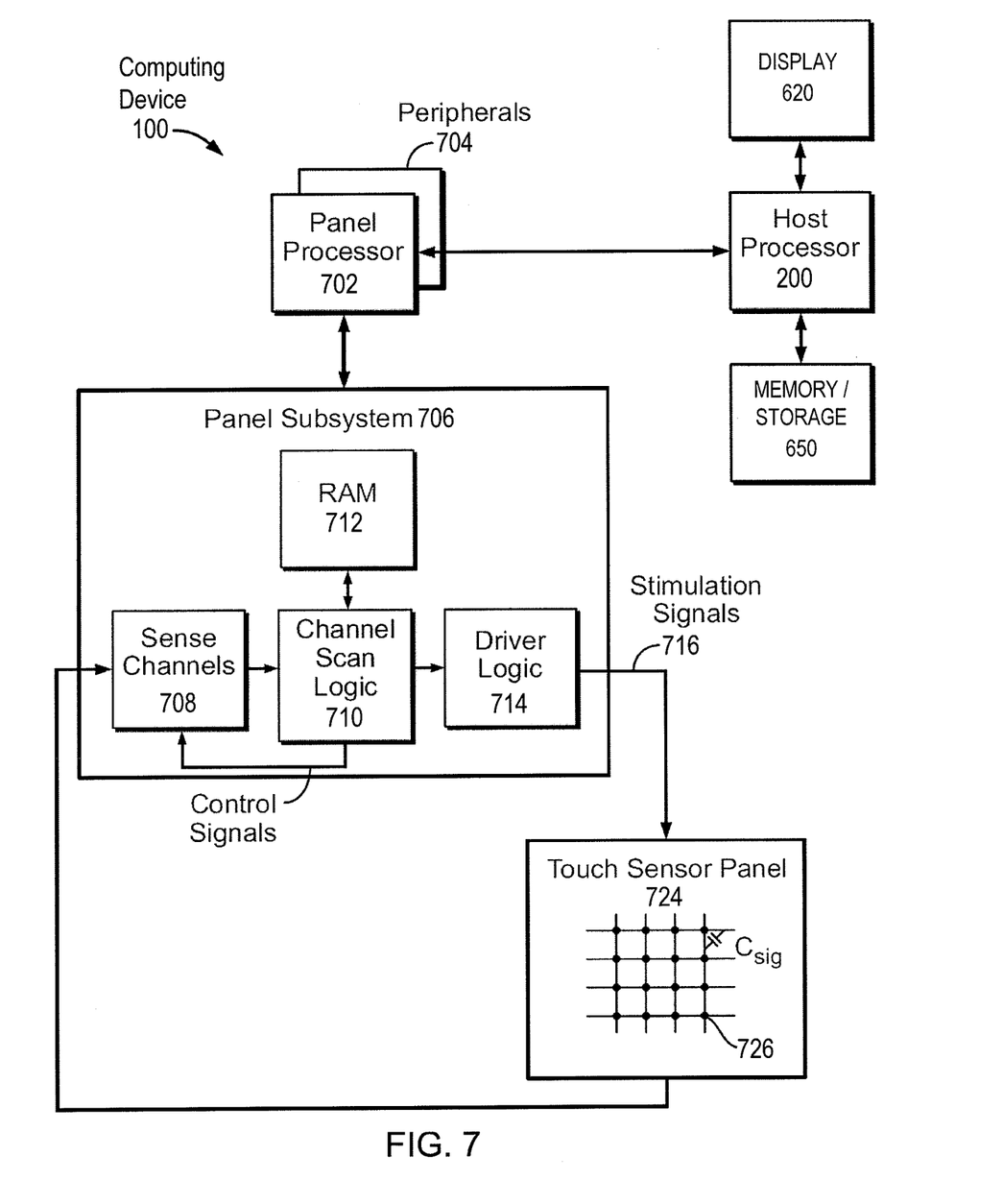
FIG. 7 illustrates an exemplary computing device including a multi-touch sensor panel according to an embodiment of the disclosure

FIG. 7 illustrates an exemplary multi-touch sensor panel that can be associated with computing device 100. Computing system 100 can include one or more panel processors 702 and peripherals 704, and panel subsystem 706 associated with a touch sensitive surface associated with input device 210 as described above. Peripherals 704 can include, but are not limited to, random access memory (RAM) or other types of memory or storage, watchdog timers and the like. Panel subsystem 706 can include, but is not limited to, one or more sense channels 708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to drive lines of touch sensor panel 724. In some embodiments, panel subsystem 706, panel processor 702 and peripherals 704 can be integrated into a single application specific integrated circuit (ASIC).

Touch sensor panel 724 can include a capacitive sensing medium having a plurality of drive lines and a plurality of sense lines, although other sensing media can also be used. Each intersection of drive and sense lines can represent a capacitive sensing node and can be viewed as picture element (pixel) 726, which can be particularly useful when touch sensor panel 724 is viewed as capturing an "image" of touch. In other words, after panel subsystem 706 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel). Each sense line of touch sensor panel 724 can drive sense channel 708 in panel subsystem 706. The touch sensor panel can be used in combination with motion sensor 660 to provide motion sensitive input control in accordance with the teachings as disclosed above.

Figure 8:
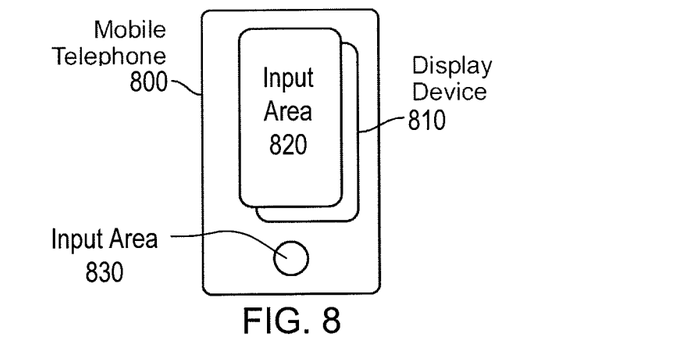
FIG. 8 illustrates an exemplary mobile telephone providing motion sensitive input control according to an embodiment of the disclosure.
Figure 9:
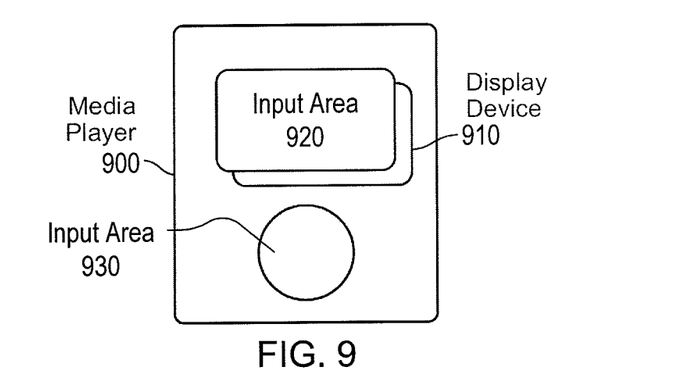
FIG. 9 illustrates an exemplary media player providing motion sensitive input control according to an embodiment of the disclosure.

Computing device 100 can be any of a variety of types, such as those illustrated in FIGS. 1, 8 and 9 for example. FIG. 1 illustrates exemplary computing device 100 in the form of a laptop with display 110 and input area 120. The input device associated with input area 120 can be configured to provide motion sensitive input control in accordance with the teachings as disclosed above. FIG. 8 illustrates exemplary mobile telephone 800 with display device 810 and input areas 820 and 830. Either input area 820 or 830, or both, can be configured to provide motion sensitive input control in accordance with the teachings as disclosed above. FIG. 9 illustrates exemplary media player 900 with display device 910 and input areas 920 and 930. Either input areas 920 or 930, or both, can be configured to provide motion sensitive input control in accordance with the teachings as disclosed above. Additionally, computing device 100 may be a combination of these types. For example, in one embodiment computing device 100 may be a device that combines functionality of mobile telephone 800 and media player 900. Motion sensitive input controls can enable the computing devices of FIGS. 1, 8 and 9 to be configured such that the likelihood of inadvertent motion of the computing device causing an unintended input event can be reduced.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computing device comprising:
an input device configured to detect an input event applied to an input area of the computing device, wherein the detected input event can include a touch begin event, a touch move event, and a touch end event, and
a processor configured to
detect a state of the computing device associated with motion;
at least partially reduce a sensitivity to touch of the input device during the detected state by increasing a magnitude threshold for detecting the input event or increasing a time threshold for detecting the input event; and
wherein the processor is configured to detect the state associated with motion based on a network connection state associated with the computing device.

2. The computing device of claim 1, wherein the processor is configured to detect the state associated with motion based on the particular type of network connection state associated with the computing device.

3. The computing device of claim 1, wherein
the computing device further comprises a camera, and
the processor is configured to detect the state associated with motion based on output from the camera.

4. The computing device of claim 1, wherein the computing device comprises a mobile telephone.

5. The computing device of claim 1, wherein the computing device comprises a media player.

6. A method comprising:
detecting a state of a computing device associated with motion, the state indicating an increased possibility of unintended input events being received by the input device;
partially reducing a sensitivity to touch of an input device associated with the computing device during the detected state by increasing a threshold associated with a magnitude of a detected measure of an input that determines whether the input can be recognized as an input event or by increasing a threshold associated with how long the input must be recognized in order for the input to be recognized as the input event;
monitoring the computing device to determine if the previously detected state of the computing device associated with motion persists; and
restoring the sensitivity to touch of the computing device once it is determined that the detected state of the computing device associated with motion has ended;
wherein detecting the state of the computing device associated with motion comprises detecting the state associated with motion based on one of a network connection state associated with the computing device or a time at which the device is operated without regard to a location at which the device is located.

7. The method of claim 6, comprising reducing the sensitivity to touch of the input device by increasing a threshold associated with a magnitude of a detected measure of an input that determines whether the input can be recognized as an input event.

8. The method of claim 6, comprising reducing the sensitivity to touch of the input device by increasing a threshold associated with how long an input must be recognized in order for the input to be recognized as an input event.

9. A laptop computing device comprising:
a capacitive trackpad configured to detect a tap applied to the trackpad; and
a processor configured to
detect a state of the computing device associated with motion, the state indicating an increased possibility of unintended input events being received by the input device,
partially reduce a sensitivity of the capacitive trackpad to taps during the detected state;
monitor the computing device to determine if the previously detected state of the computing device associated with motion persists; and
restore the sensitivity to touch of the computing device once it is determined that the detected state of the computing device associated with motion has ended;
wherein the processor is configured to detect the state associated with motion based on a network connection state associated with the computing device.

10. The laptop computing device of claim 9, comprising reducing the sensitivity of the capacitive trackpad by increasing a threshold associated with how hard an object must tap the trackpad to trigger a tap input event.

11. A computing device comprising:
an input device configured to detect an input event applied to an input area of the computing device; and
a processor configured to
detect a state of the computing device associated with motion,
partially reduce a sensitivity to touch of the input device during the detected state;
monitor the computing device to determine if the previously detected state of the computing device associated with motion persists; and
restore the sensitivity to touch of the computing device once it is determined that the detected state of the computing device associated with motion has ended;
wherein the processor is configured to detect the state associated with motion based on a network connection state associated with the computing device.

12. The computing device of claim 11, wherein the processor is configured to detect the state associated with motion which corresponds to an increased likelihood of inadvertent motion of the computing device.

13. The computing device of claim 1, wherein the processor is configured to detect the state associated with motion based on an increased possibility of unintended input events being received by the input device.

14. A computing device comprising:
an input device configured to detect an input event applied to an input area of the computing device, wherein the detected input event can include a touch begin event, a touch move event, and a touch end event, and
a processor configured to
detect a state of the computing device associated with motion;
at least partially reduce a sensitivity to touch of the input device during the detected state; and
wherein the processor is configured to detect the state associated with motion based on a time at which the device is operated without regard to a location at which the device is located.

15. The computing device of claim 14, wherein
the computing device further comprises a camera, and
the processor is configured to detect the state associated with motion based on output from the camera.

16. A laptop computing device comprising:
a capacitive trackpad configured to detect a tap applied to the trackpad; and a processor configured to
- detect a state of the computing device associated with motion, the state indicating an increased possibility of unintended input events being received by the input device,
- partially reduce a sensitivity of the capacitive trackpad to taps during the detected state;
- monitor the computing device to determine if the previously detected state of the computing device associated with motion persists; and
- restore the sensitivity to touch of the computing device once it is determined that the detected state of the computing device associated with motion has ended;

wherein the processor is configured to detect the state associated with motion based on a time at which the device is operated without regard to a location at which the device is located.

17. The laptop computing device of claim 16, comprising reducing the sensitivity of the capacitive trackpad by increasing a threshold associated with how hard an object must tap the trackpad to trigger a tap input event.

18. A computing device comprising:
an input device configured to detect an input event applied to an input area of the computing device; and
a processor configured to
- detect a state of the computing device associated with motion,
- partially reduce a sensitivity to touch of the input device during the detected state;
- monitor the computing device to determine if the previously detected state of the computing device associated with motion persists; and
- restore the sensitivity to touch of the computing device once it is determined that the detected state of the computing device associated with motion has ended;

wherein the processor is configured to detect the state associated with motion based on a time at which the device is operated without regard to a location at which the device is located.

19. The computing device of claim 18, wherein the processor is configured to detect the state associated with motion which corresponds to an increased likelihood of inadvertent motion of the computing device.

* * * * *